Patented Aug. 30, 1949

2,480,352

UNITED STATES PATENT OFFICE 2,480,352

SEPARABLE LINER FOR TACKY ELASTOMERS

John Alfred Bicknell, Westbrook, Maine, assignor to S. D. Warren Company, Boston, Mass., a corporation of Massachusetts No Drawing. Application November 4, 1944, Serial No. 562,049

6 Claims. (Cl. 117—90)

This invention relates to sheet material which is easily removable from contact with the surfaces of tacky elastomers, e. g. natural or synthetic rubber and the like. The invention is particularly applicable in the case of synthetic rubbers made by the copolymerization of butadiene and a synthetic resin monomer such as acrylonitrile, isobutylene, styrene, etc. Typical of these synthetic rubbers is the so-called GR-S or Buna-S rubber made by copolymerization of butadiene and styrene.

The fact that GR-S rubber and similar synthetic rubbers possess both cold-flow and tackiness complicates the handling, transporting and storing of such rubbers. Such synthetic rubbers generally are formed into units of convenient size for handling and such units are then isolated one from another to prevent running together or blocking. A common commercial practice is to press the elastomer, e. g. GR-S rubber, into blocks weighing about 75 pounds. Dusting such blocks with talc or other unctuous powder is not effective to prevent adjacent blocks from coalescing since the rubber soon flows between and around the powder particles completely enveloping them. Ordinary paper separators are not satisfactory because the rubber adheres so strongly that the paper can be stripped away only with difficulty if at all, and fibers of the paper are invariably left adhering to the rubber, contaminating the same. Passable but not wholly satisfactory results are obtained by using a paper protector coated with a fairly heavy layer of talc, or talc and clay, bound together with a water-soluble adhesive such as casein, while at the same time dusting either the surface of the rubber or the surface of the coated paper with a plentiful supply of an unctuous powder such as talc or zinc stearate. Obviously much to be desired is a separating or protecting sheet which serves satisfactorily without requiring an additional step of dusting. The cost of the sheet also is an important consideration.

The present invention provides a coating composition which may be spread upon a support, preferably paper, to form a protecting or separating sheet which effectively prevents blocking of tacky elastomers during handling, storage, etc., and which may quickly and easily be removed from said elastomer after it has served its purpose. Said coating composition comprises an aqueous dispersion of a water-insoluble unctuous soap powder such as an aluminum soap, and finely divided particles of a mineral wax, and preferably also a small quantity of some protective agent to stabilize the dispersion. The composition when applied to a support and dried provides a layer or coating consisting chiefly of discrete particles of the insoluble soap bound together and to the support by a matrix of the mineral wax. Normally from about 1.5 to 7 pounds of coating per 1000 sq. ft. of surface will give excellent results. Heavier weights may be used but do not seem in general to be worth their added cost.

Suitable water-insoluble unctuous soap powder fillers for the coating are the palmitate and stearate of zinc, ferric oleate and the aluminum soaps. The mineral wax may be ozokerite, ceresin, montan wax, petroleum wax, or the like. Paraffin wax is very suitable and its use is economically advantageous. Mineral wax is much to be preferred to a vegetable wax like carnauba wax not only because it is cheaper but more importantly because its compositions are less brittle.

In preparing the coating composition of the invention the mineral wax in molten condition may first be emulsified in water, usually in the presence of a protective agent. The insoluble unctuous soap powder filler, preferably first wetted with water containing a wetting agent, may then be stirred into the wax dispersion. The ratio of wax to filler is not critical; enough wax should be used to bind the filler to the base securely enough so that the coating will not flake off when the sheet is handled. A ratio of 1 part by weight of paraffin wax to 10 parts by weight of zinc stearate has given satisfactory results when the coating has consisted essentially of these two ingredients, but a ratio of 3 parts of paraffin wax to 10 parts of zinc stearate is usually somewhat more satisfactory. In other cases, equal parts by weight of mineral wax and the insoluble soap have been used with goods results. Higher ratios of wax binder to insoluble soap, up to as high as a ratio of 10 to 1, generally are operable but not advantageous. In general, however, there is usually no point in using more wax than is needed for securely binding the filler to the base.

The mineral wax is preferably dispersed in water by mechanical means, as by use of a homogenizer. A protective agent of the nature of dextrin, starch, gum ghatti, gum arabic or the like, is advantageously present when the dispersion is made. Somewhat less desirable dispersions may be made by emulsifying molten mineral wax by means of a small quantity of soluble soap such as sodium stearate. Large quantities of soluble soap appear to have a deleterious effect upon the final coating. Moreover, since the presence of any soluble soap in the coating mixture makes the avoidance of foam very difficult it is, for this reason if for no other, somewhat disadvantageous to use a soluble soap emulsifier.

When the sheet or liner of the invention, say a paper sheet coated with a paraffin wax and insoluble soap mixture, is applied to the surface of an elastomer like GR-S rubber and is then removed, the parting occurs very easily; but in many and perhaps all cases, the coating appears to split, part of it adhering to the elastomer and part remaining attached to the supporting paper base. In such a case the cleavage apparently takes place between the particles of insoluble soap and the wax, where there seems to be little adherence. For this reason in the present instance paraffin wax makes a much more desirable adhesive than a water-soluble binder, e. g. casein or other conventional adhesive, which wets the insoluble soap and adheres more firmly to it. Possibly the explanation of the deleterious effect of an excessive quantity of soluble soap in the coating composition is that the soluble soap in the interface between the wax and the insoluble soap tends to make the two adhere more strongly to each other and this acts to prevent the desired cleavage when the sheet is stripped from the elastomer.

The aqueous coating composition of the invention may be applied to the supporting base, e. g. a paper web, by any suitable method or means. The water content of said composition may be varied at will to suit the particular method of coating employed. A solids content in the coating composition ranging from about 20% to about 50% by weight may in general be expected to give satisfaction. The coated sheet may be dried by application of heat, and the temperature may be above the melting point of the mineral wax, but the temperature of drying should not be raised above the melting point of the insoluble filler, e. g. zinc stearate. Consequently, said insoluble filler will remain dispersed throughout the mineral wax in the form of finely divided discrete particles. It is not necessary to melt the wax but the particles thereof must be welded together into a coherent film.

Generally speaking, especially for use with GR-S rubber, the particular quality of paper base to be used is not important. The base naturally should be strong enough so that it can be manipulated and treated without being torn; likewise it should not be so porous that the coating cannot remain upon its surface. A well-knit sheet of kraft paper is usually eminently satisfactory. Should a paper web be too porous to hold up the coating well it may be made satisfactory by surface-sizing or seal-coating with an adhesive substance, with or without added filling material. Starch, casein, glue, alkali silicate or the like may be used, together if desired with clay or other filler. It is particularly advantageous to use a seal-coat under the wax coat in preparing a protective sheet intended for use with an elastomer which has exceptionally pronounced qualities of tackiness and cold-flow, such as co-polymerized butadiene and isobutylene, for example. Such a seal-coat prevents penetration of the top coat into the paper base and is an added safeguard against penetration of the elastomer through the top coat into the paper base. A very satisfactory sealing coat comprises water-glass or other alkali metal silicate, which may have dispersed therein talc, clay or other filler.

Specific embodiments of the invention follow:

Example 1

170 parts of paraffin wax (M. P. 140° F.) was melted and stirred into 225 parts of hot water containing 10 parts of gum ghatti, and the mixture was passed through a homogenizer to form a stable dispersion.

400 parts of zinc stearate powder was gradually stirred into 415 parts of water containing 18 parts of Triton NE (a polyether alcohol wetting agent) and 4 parts of tri-butyl phosphate (an anti-foam agent). It may be noted that neither wetting agent nor anti-foaming agent is essential, but their use facilitates mixing.

The two aqueous dispersions were then mixed together and diluted with water until the solids content was 31%. This mixture was applied to one side of a kraft paper base weighing about 24 pounds per 1000 sq. ft. The composition was applied by an "air-brush" according to the method disclosed in U. S. Patent No. 1,980,923, and dried at 140° F. About 2 pounds dry weight of coating was left on the sheet per 1000 sq. ft. of area coated.

The finished sheet was made up into envelopes with the coated side facing inwards, said envelopes being of suitable size to enclose a 75 pound block of GR-S rubber. A block of GR-S at about 200° F. temperature was placed in one of the envelopes the top of which was then closed by stitching. After several weeks the envelope was opened and inverted, whereupon the GR-S block fell out, from its own weight, without sticking to or tearing the envelope.

Example 2

Kraft paper of 80 pounds weight on a 25″ x 38″-500 sheet basis was coated on each side with 18 pounds dry weight of a coating comprising 32 parts of sodium silicate, 50 parts of talc and 50 parts of fine coating clay. The coated paper was dried and a top coat of mineral wax and zinc stearate identical with that used in Example 1 was then applied to each side of the sheet in amount equal to about 18 pounds dry weight. This product when dry was easily separable from so-called butyl rubber, a product identical with or very similar to copolymerized butadiene and isobutylene.

Example 3

A coating composition consisting of 50 parts by weight of zinc stearate, 3 parts by weight of wetting agent, 0.5 part by weight of an anti-foaming agent, 80 parts by weight of water and 13 parts by weight of wax emulsion consisting of

| | Parts by weight |
|---|---|
| Paraffin wax | 5 |
| Water | 7.3 |
| Protective colloid | 0.7 | was prepared as described in Example 1 and applied to one side of a strong paper base of 80 pound basis 25″ x 38″-500, the amount of coating applied being 8 to 10 pounds per ream. The resulting coated paper or liner was tested by being pressed against GR-S rubber at 194° F. for several hours and then cooled and pulled off.

Example 4

The following coating composition was prepared as described in Example 1 and tested as described in Example 3. 30 parts by weight of aluminum stearate, 3 parts by weight of a wetting agent, 0.5 part by weight of an anti-foaming agent, 80 parts by weight of water and 53 parts by weight of a wax emulsion consisting of

| | Parts by weight |
|---|---|
| Ceresin | 20 |
| Protective colloid | 2.5 |
| Water | 30.5 |

Example 5

The following coating composition was prepared as described in Example 1 and tested as described in Example 3. 25 parts by weight of zinc stearate, 25 parts by weight of talc, 1.5 parts by weight of wetting agent, 0.3 parts by weight of anti-foaming agent, 60 parts by weight of water and 53 parts by weight of wax emulsion consisting of

| | Parts by weight |
|---|---|
| Paraffin wax | 20 |
| Protective colloid | 2.5 |
| Water | 30.5 |

In the foregoing Examples 3, 4 and 5 known wetting agents, anti-foaming agents and protective colloids were used in preparing the compositions and in all three instances the liners were readily separable from the rubber.

While the product of the invention, i. e. a paper base having a seal coating and a surface coating of insoluble unctuous soap powder bound by mineral wax, has been described chiefly in relation to use with synthetic rubber, it is obvious that sheet materials other than paper, such as fabric, may serve as the base and that the product, coated on one or both sides as desired, may be used as a protective or separatory sheet for natural rubber as well as various other tacky elastomers or resinous substances.

Without limiting the invention thereto, it is noted that a probable explanation of the utility of the coatings described is that the wax binder of the coating is impervious to the elastomers and prevents them from penetrating through the coating to the paper base, and the wax binder with the insoluble soap, which do not strongly adhere to each other, provides a layer between the paper base and the elastomer which breaks more readily than either the paper base or the elastomer.

I claim:

1. A paper product suitable for use as a liner for tacky elastomers comprising paper having a base coating consisting essentially of an alkali metal silicate and a finely divided filler and a top coat consisting essentially of from 1 to 10 parts by weight of a mineral wax binder having dispersed therein from 10 to 1 parts by weight of preformed discrete particles of a water-insoluble soap.

2. A paper product suitable for use as a liner for tacky elastomers comprising a paper base having a seal coating and a top coat consisting essentially of from 1 to 10 parts by weight of a mineral wax binder having dispersed therein from 10 to 1 parts by weight of discrete particles of an unctuous water-insoluble soap, said seal coating being substantially impermeable to said top coat and to said elastomers.

3. A paper product as defined in claim 1 in which the mineral wax binder is paraffin wax and the water-insoluble soap is zinc stearate.

4. A paper product as defined in claim 2 in which the water-insoluble soap is zinc stearate.

5. A paper product as defined in claim 2 in which the water-insoluble soap is aluminum stearate.

6. A paper product as defined in claim 2 in which the top coat consists essentially of from 3 to 10 parts by weight of paraffin wax and about 10 parts by weight of zinc stearate.

JOHN ALFRED BICKNELL.

REFERENCES CITED

The following references are of record in the file of this patent:

UNITED STATES PATENTS

| Number | Name | Date |
|---|---|---|
| 931,350 | Thoma | Aug. 17, 1909 |
| 1,168,223 | Pembroke | Jan. 11, 1916 |
| 1,266,956 | Kniffler | May 21, 1918 |
| 1,460,251 | Kramer | June 26, 1923 |
| 1,472,239 | Buell | Oct. 30, 1923 |
| 1,592,853 | Hoffman | July 20, 1926 |
| 1,694,276 | Mohrle | Dec. 4, 1928 |
| 1,780,917 | Hoch | Nov. 11, 1930 |
| 2,015,865 | Muller | Oct. 1, 1935 |
| 2,044,596 | Smith | June 16, 1936 |
| 2,069,786 | Van der Meulen | Feb. 9, 1937 |
| 2,187,858 | Kern | Jan. 23, 1940 |
| 2,201,537 | Hickler | May 21, 1940 |
| 2,310,712 | Schmied | Feb. 9, 1943 |
| 2,320,644 | Nill | June 1, 1943 |
| 2,348,687 | Abrams | May 9, 1944 |
| 2,357,948 | Gessler | Sept. 12, 1944 |
| 2,369,992 | Treacy | Feb. 20, 1945 |
| 2,378,972 | Bode | June 26, 1945 |
| 2,396,633 | Bernstein | Mar. 19, 1946 |
| 2,426,300 | Edelstein | Aug. 26, 1947 |